United States Patent Office 3,510,253
Patented May 5, 1970

3,510,253
METHOD OF REMOVING SULFUR DIOXIDE FROM GASES
Volker Fattinger and Walter Jäger, Wiesbaden, and Gerd Petersen, Wiesbaden-Sonnenberg, Germany, assignors to Hugo Petersen, Wiesbaden, Germany
Filed Dec. 6, 1965, Ser. No. 511,612
Claims priority, application Germany, Dec. 19, 1964, P 35,726; Apr. 28, 1965, P 36,656
Int. Cl. C01b *17/60*
U.S. Cl. 23—2     21 Claims

ABSTRACT OF THE DISCLOSURE

Process of removing $SO_2$ from gas flows containing minor amounts of $SO_2$. Gaseous ammonia is added to the gas flow and a liquid containing ammonium sulfite, ammonium bisulfite and/or ammonium sulfate is injected into the gas flow to form $(NH_4)_2SO_3$ mist. The gas flow is then conveyed to a mechanical separating zone in which the gas flow and the injected liquid are brought into intimate contact with each other to separate the mist and the injected liquid from the gas flow. The process causes essentially quantitative removal of $SO_2$. According to a preferred embodiment, the ammonia and liquid enriched gas flow is divided in the mechanical separating zone into a plurality of part flows of less than 5 mm. thickness. The process is particularly suitable for the purification of $SO_2$-containing waste gases and effectively facilitates air pollution control.

---

Figure 1:
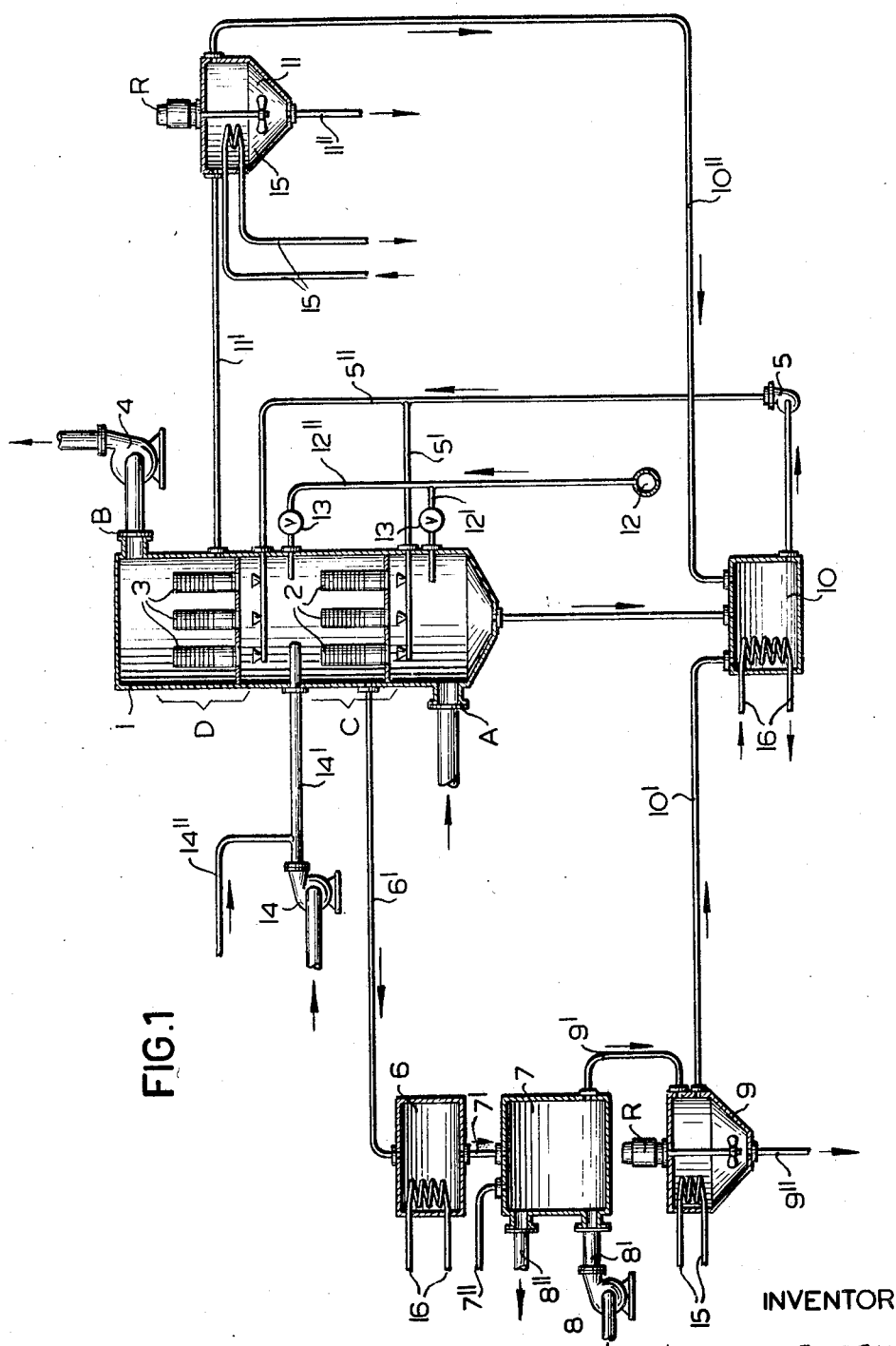

This invention generally relates to sulfur dioxide removal and recovery processes and is particularly directed to a process for first removing $SO_2$ from off gases or waste gases (hereinafter being referred to as "gas flows") and subsequently recovering the removed $SO_2$. Pursuant to the inventive process, free $SO_3$, sulfuric acid mists or other mists are simultaneously removed from the gas flows. The invention is also concerned with apparatus for carrying out the inventive process.

It has previously been suggested to remove $SO_2$ from gas flows by absorption in ammonium sulfite and bisulfite liquors. These known processes, however, have several disadvantages which are difficult to overcome. These difficulties include the insufficient absorption of the $SO_2$ in the liquors, the occurrence of strong mists which are caused by small amounts of free $SO_3$ and $H_2SO_4$ in the off gases of such plants as well as the considerable investment necessary for equipment of such absorption plants.

If $SO_2$ gas is treated in a wash tower or scrubber or in a different gas washing device with wash liquor and the $SO_2$ is absorbed in the liquor under the formation of ammonium salts, then ammonia has to be added to the liquor in amounts corresponding to the $SO_2$ absorption. It is known to adjust the addition of the ammonia so that the pH in the liquor is maintained at a predetermined value. The pH value thus serves as a measure or indication for the $NH_3/SO_2$ ratio or, expressed in a different manner, for the sulfite-bisulfite ratio in the wash liquor. An insufficient amount of ammonia, to wit, a low molar ratio $NH_3/SO_2$ or a low pH value thus are tantamount in this known process to a poor $SO_2$ absorption.

By contrast, too much ammonia in the liquor is tantamount to a high $NH_3/SO_2$ ratio and a high pH value. This, in turn, results in ammonia losses due to the entrainment of ammonia in the final gas. Furthermore, excess of ammonia causes undesired mist formations in the plant. In circulating systems, the pH value is largely maintained at a constant value by addition of ammonia while the density or specific weight of the liquor is maintained constant by the addition of water. In conformity with the increase of the volume of the liquor, a liquor of a density of about 1.2 is continuously withdrawn. Typical operating values for such known gas washing plants are as follows:

| | |
|---|---|
| Density of the wash liquid | 1.2 |
| pH value of the wash liquid | 5.5 |
| Mole ratio $NH_3/SO_2$ of the liquor | 1.25 |
| $SO_2$ content in the crude gas, percent by volume | 0.4 |
| $SO_2$ content in the pure gas, percent by volume | 0.11 |

In known two-step plants, a further gas washing treatment is carried out subsequently. The wash liquor for this gas washing treatment is then maintained at a lower density. In such two-stage plants, a final gas containing about 0.03% by volume of $SO_2$ is obtained.

For the further processing of the wash liquor, the sulfite-bisulfite liquors are admixed with sulfuric acid, whereby ammonium sulfate is formed and $SO_2$ is liberated. In the event that the dissolved ammonium sulfate is not to be directly used for fertilizer production, solid ammonium sulfate is produced by concentration and crystallization.

With a view to eliminating the costly concentration of the liquors, it has previously been suggested to carry out the washing of the gas flow with a saturated or almost saturated ammonium sulfate solution. Although this absorption method has been known for more than 30 years, it has not been accepted by the industry because crystallizations in the wash towers are unavoidable and cause great difficulties. The sulfide-bisulfite which is formed by the $NH_3$ addition and the $SO_2$ absorption in the wash liquor, causes direct salting out of solid ammonium sulfate. Additional ammonium sulfate is crystallized in this known process from the wash liquor by addition of sulfuric acid and expelling of the $SO_2$. The mother liquor freed from $SO_2$ is then recycled to the gas washing tower.

It is moreover known to convert the $SO_2$ content of a gas flow into a mist by addition of ammonia into the gas flow. In this mist, the $SO_2$ is chemically bound and the mist is subsequently precipitated or separated. Seemingly due to the technical difficulties occurring in a wet gas purification processes, the formation of a dry mist has been desired and attempts have been made to separate these dry mists in electro-filtering devices. The ammonia addition to the gas takes place in this proposed process preferably above the dew point of the ammonium salt formation. During the subsequent cooling, a mist is formed which, in addition to ammonium salt, also contains thiosulfate and polysulfides.

It is a primary object of this invention to overcome the difficulties of the prior art processes in removing $SO_2$ from gas flows.

Generally, it is an object of this invention to improve on the art of $SO_2$ removal and subsequent recovery, as presently practiced.

Contrary to the last mentioned process referred to, the process according to the present invention is a wet process. However, in at least one stage of the process for the $SO_2$ precipitation, $NH_3$ gas or an $NH_3$-containing gas mixture or a liquid which is capable of liberating gaseous $NH_3$, is injected into the $SO_2$-containing gas flow. Typical for the reaction in this stage of the process is that the ammonia, before it reacts with the $SO_2$, is at least partly or totally present in gaseous form. This is an essential difference to most of the wet processes for the removal of $SO_2$ with ammonia-containing liquids.

The invention is based on the basic realization and concept that, instead of a liquid method which requires a large absorption space, a condensation of neutral ammonium sulfite from the gaseous state under mist formation takes place, and this mist, jointly within an additional liquid, is then precipitated. In accordance with the invention, the removal of $SO_2$ from gas flows by the addition of gaseous ammonia to the gas flow and separation of the formed mist is carried out in such a manner that a liquid is sprayed into the gas flow which latter is mixed with ammonia, the liquid containing ammonium sulfite or ammonium bisulfite and/or ammonium sulfate, and that the gas subsequently is conveyed to a mechanical separator in which intimate contact between the liquid and gaseous phases takes place to cause the precipitation of the mist and of the liquid which has been sprayed into the gas.

In accordance with the invention and in spite of the $NH_3$ addition to the gas flow and the mist formation, an ammonium sulfate solution or solid ammonium sulfate is obtained which, from a practical point of view, is free from thiosulfate or polysulfide. This is so, although concentration is not necessary because the mist formation is carried out at lower temperatures and with sufficient moisture. The moisture favors evidently the course of the reaction under exclusive formation of $(NH_4)_2SO_3$. With moist $SO_2$ gases, gaseous ammonia is preferably added to the gas flow in operating according to the inventive method. The addition by spraying of the liquid which contains the ammonium sulfite or bisulfite and/or ammonium sulfate is advantageously effected in the same reaction space in which the ammonia is added. However, the liquid may be added prior to or after the ammonia addition. However, it is more advantageous if the liquid is added after the gas flow has been mixed with the ammonia, provided the crude gas flow is largely saturated with steam. If the process is carried out with a dry gas flow or with gas flows of higher temperatures, aqueous ammonia solution can be injected into the gas flow in order to liberate $NH_3$ and to create the required moist atmosphere. If ammonia solution is sprayed into the gas, the water evaporates in the dry or warm gas and the liberated gaseous ammonia forms a mist with the $SO_2$ content of the crude gas flow, which mist is largely devoid of thiosulfate and polysulfide.

The control of the amount of added ammonia is carried out in accordance with the invention in response to the $SO_2$ content of the pure gas obtained after the purification and not as in the known wet treating processes according to the pH value of the wash liquid. The control of the amount of ammonia may thus, for example, be effected by continuously measuring the $SO_2$ content in the purified gas flow. It has also been found to be advantageous for this purpose to measure a part flow of the purified gas flow of less than .1%, calculated on the supplied gas flow, in intimate contact with a constant flow of distilled water.

When the pH increases, or upon decreases of the conductivity, the ammonia addition to the crude gas flow is decreased. By contrast, when the pH decreases or the conductivity increases, the amount of ammonia is increased. The pH of the final gas which is measured in this manner, to wit, of the liquid which is analyzed, is maintained at a value of about between 3 and 4.

The surprising effect was observed in this process that the purity of the final gas is largely independent from the pH value of the wash liquid. Also with relatively acidic wash liquid, a very high separation degree for the $SO_2$ is obtained. The wash liquid gives off substantially less $SO_2$ to the gas than could have been expected from the vapor pressure. The explanation for this phenomenon, which seemingly is contrary to theory expectations, appears to be a covering of the liquid surface with separated sulfite. In purifying $SO_2$-containing gas flows in accordance with this invention, it is possible either to obtain with the same pH value of the wash liquid a better purity of the final gas, or at the same final gas purity as in the known processes to operate at a lower pH value of the wash liquid. Consequently, less sulfuric acid is required for the subsequent liberation of the $SO_2$ from the wash liquid and after the expelling of the $SO_2$ less $NH_3$ is required.

Typical values for a one-stage gas washing procedure of the invention are the following:

| | |
|---|---|
| Density of the wash liquid | 1.2 |
| pH value of the wash liquid | 5.2 |
| Mole relation $NH_3/SO_2$ | 1.2 |
| $SO_2$ content in the crude gas flow, percent by volume | 0.4 |
| $SO_2$ content in the pure gas, percent by volume | <0.02 |

If these values are compared with the previously mentioned operating values of a known one-stage gas washing plant, it is evident that with the same density of the wash liquid, it is possible to operate at a lower pH value of the wash liquid and, starting from the same $SO_2$ of the crude gas flow, the purified gas flow contains less than ⅕ $SO_2$. The purified gas, in accordance with the process of this invention, is moreover free from visible mists, while in the known wet gas purification processes an electro-filter is normally required behind the wash tower in order to separate the mists.

A Petersen pressure differential separator is advantageously employed as mechanical separator for carrying out the inventive process. The Petersen pressure differential or pressure jump separators are manufactured in Germany and known there as "Petersen Drucksprung-Abschneider." Reference is also had to U.S. patent application Ser. No. 290,364, now Patent No. 3,375,058. However the process can, of course, be carried out with different separators. Any separator in which intimate contact between the gas flow and the liquid phase takes place could be used although, as mentioned, the Petersen separator yields particularly favorable results in carrying out the inventive process. The mechanical separators should divide the gas flow into partial flows of below 5 mm. thickness or diameter, preferably 0.2–2 mm. thickness, and should have a gas resistance of at least 40 mm. water column, preferably, however, between 80 and 350 mm. water column. The required fineness of the slots of the separator for obtaining a mist-free final gas is largely dependent on the additional contaminants contained in the waste gas. $SO_3$ mists require fine slots. In the absence of $SO_3$, relatively coarse slots are sufficient in order completely to separate the sulfite mists formed by the $NH_3$.

Separators exhibiting larger gas resistance are also suitable; however, such larger gas resistance, which requires large expenditure and energy, is not required.

The invention yields not only a very pure final gas flow but, as will be understood from the following, also results in a decisive simplification of the further processing of the wash liquid. The small space requirement and the low investment costs for the plant compared with plants operating in accordance with the absorption principle should also be mentioned as important advantages of the inventive procedure.

The wash liquid after discharge from the separating zone and laden with ammonium sulfite or ammonium bisulfite may be conveyed to a separating vessel for the purpose of crystallization and separation of the crystallized ammonium sulfate. After the crystallization, the mother liquor is again recycled to the gas washing stage in the separator. Sulfuric acid may be used for causing oversaturation for the crystallization in a separating container into which a portion or the entire wash liquid is conveyed. The separating container then constitutes an $SO_2$ developer in which the formed sulfite or bisulfite is converted into ammonium sulfate by the sulfuric acid addition under simultaneous $SO_2$ liberation.

It is advantageous if the crystallization of ammonium sulfate in the gas washing device proper is impeded and if care is taken that solid ammonium sulfate precipitates practically only in the separating container into which the entire gas washing liquid or a portion thereof is conducted. This is accomplished by increasing the amount of the circulating liquid and by using a classifying or selected crystallization. Of course, the steam content of the gas flow is of decisive importance for the crystallization procedure because, dependent on whether the gas flow takes up or gives off steam, a change in the concentration conditions takes place. Particularly with relatively dry gas flows and in order to prevent crystallization in the separator proper, water is added to the wash liquid prior to its being sprayed into the mechanical separator in which the intimate contact takes place. This water addition need not consist of pure water but can also be effected in the form of diluted solutions which must have a lower concentration than the mother liquor which emanates from the crystallization.

The sudden or instantaneous condensation of the neutral ammonium sulfite in the form of a mist from the gaseous state requires for 1 mole $SO_2$ 2 mole of $NH_3$. In order to decrease the $NH_3$ consumption, one or several pretreatment steps or stages may be arranged ahead of the main stage previously described, to wit, the stage in which the gaseous ammonia reacts with the gas flow. In this pretreatment stage, a portion of the $SO_2$ may be bound by wash liquor by absorption.

For the almost complete separation of the $SO_2$ in form of a mist, it is theoretically required to use 2 mole of $NH_3$ for 1 mole of $SO_2$. In many instances, however, it is desired to separate from the gas as much $SO_2$ as possible with as little $NH_3$ as possible. In further developing the invention, it has thus been found possible to separate per mole of added $NH_3$ substantially more than ½ mole of $SO_2$. For this purpose, and prior to the main stage in which the gaseous ammonia is employed, a portion of the $SO_2$ is absorbed in a pre-stage by pretreatment. Ammonium sulfite- or ammonium sulfate-containing liquids are used as absorption liquors for this purpose. These solutions absorb the $SO_2$ under bisulfite formation. This pre-stage may, for example, consist of an absorption tower. However, it may also be advantageous to use a differential pressure separator or a different absorption device. The absorption liquid which emanates from this pre-stage may subsequently be admixed with sulfuric acid. The $SO_2$ which is liberated in this manner is thereafter removed, whereupon the liquor is again supplied to the gas purification plant where the liquor again absorbs $SO_2$. Due to this procedure, ammonium sulfate is continuously formed in the circulating liquid, whereby the solubility of the former is exceeded unless a portion of the liquid is continuously withdrawn.

Instead of removing ammonium sulfate solution under corresponding replenishment by water, the invention provides, according to a further modification, for a direct recovery of solid ammonium sulfate in this stage of the process. For this purpose, the degassed wash liquid is passed through a crystallizer in which, by intimate contact with solid ammonium sulfate, the saturated solution is brought to selective or classifying crystallization. In order to prevent crystallization within the gas washing device of the pre-stage and for the purpose of improving the degassing of the wash liquid after the sulfuric acid addition, it has been found to be advantageous to heat the liquor prior to the degassing and/or prior to the spraying into the gas washing plant, while the liquid in the crystallizer by contrast is cooled. The heating can be effected, for example, by built-in heating coils, in indirect manner. However, it is also feasible to effect heating by the addition of steam to the gas washing or scrubbing device.

It is desirable to prevent crystallization within the separator and during the pretreatment of the gas flow. For this purpose, it has been found to be advantageous to maintain a temperature differential of at least 2° C. between the crystallizer or crystallizers and the inner space of the gas washing device. This can be readily accomplished by effecting suitable heating and cooling, respectively. Although the temperature dependency of the solubility of the salts which are formed is relatively small, a temperature differential of 2 to 3° C. results in a surprising effect.

In many instances, direct addition of steam results in additional advantages. In the event that the gas flow contains $SO_3$, this $SO_3$ is converted by means of the steam into sulfuric acid mists. These mists are subsequently separated or precipitated in the mechanically operating separator. Also compounds of nitrogen oxides and $SO_3$ which cause mist formation are destroyed by the steam and the sulfuric acid mists thus formed are subsequently also precipitated in the separator. In respect to gases which, in addition to $SO_2$, also contain gaseous $SO_3$, it has been found that a proper dosage of the amount of steam to be added is important. If the amount of steam is insufficient, then the subsequent separation of the mist which is formed by the ammonia addition is rendered more difficult and fine bluish mist has a tendency to escape with the purified off gases discharged from the gas purification device. On the other hand, if a large excess of steam is used, again it is difficult to obtain a mist-free final gas flow. A proper dosage of the steam amount, calculated on the amount of gas flow, makes it, however, possible to produce a completely invisible optically clear final gas. Experience has demonstrated that for the purpose of obtaining a pure mist-free final gas flow, 0.5 to 10 grams of steam per Nm.$^3$ of gas should be added. The purest final gas was obtained with a steam amount of 1 to 4 grams per Nm.$^3$ of gas.

According to a further feature of the inventive process, a liquid of the same composition is injected into the gas flow both for the pretreatment stage and for the main stage. By using the same liquid for the two purposes referred to, the operation of the plant is simplified, more uniform results are obtained and, in addition, the plant can be operated with a single liquid feed pump.

The amount of $SO_2$ to be absorbed in the pre-stage or pretreatment can be adjusted and calculated by the size or magnitude of the pre-stage. From a practical point of view, it has been found to be advantageous to make the absorption stage, to wit, the prestage, so large that the pH value of the circulating liquid will have a value of between about 4.6 to 5.4. The larger the amount of $SO_2$ which is absorbed in the prestage, the lower is the pH value. Practical results have indicated that about 40 to 70% of the total amount of $SO_2$ can be absorbed in the pre-stage.

The addition of ammonia to the gas flow after the pre-stage is adjusted in accordance to the purity of the final gas which is desired. Traces of $SO_2$ which are still present in the final gas may, for this purpose, be continuously ascertained or measured.

The addition of ammonia to the gas flow could theoretically result in cloggings at the exit openings of the conduits through which the ammonia is conveyed. This can be prevented by admixing the ammonia with air or another gas before the ammonia is introduced into the main gas flow of the gas washing plant. For example, the ammonia may be supplied through a feed arrangement consisting of two concentrical pipes, the ammonia ($NH_3$) flowing through the inner pipe while air is conducted through the outer pipe of the concentrical pipe pair.

The final products of the inventive process need not necessarily consist of solid ammonium sulfate or an ammonium sulfate solution although, of course, in many instances it is of great advantage to obtain such products. The process can, of course, be arranged so that a sulfite or bisulfite solution or solid sulfite is recovered. By reaction of the ammonium sulfites with other bases such as $KOH$, $NAO_4$ or $Ca(OH)_2$, the ammonium sulfites can be converted into the corresponding other sulfites and the ammonia is liberated and again recycled to the process.

It is also feasible within the scope of this inventive process, to obtain completely pure 100% $SO_2$. For this purpose, it is advantageous to divide the degassing of the circulating liquid into two stages. Such subdivision of the degassing procedure also facilitates the addition of the sulfuric acid which is added for the purpose of liberating the $SO_2$. In other words, it is simpler and facilitates the reliability of the operation if the degassing is effected in stages. In this two-stage degassing procedure, only a portion of the circulating liquid is subjected to degassing by admixing this part flow of the liquid with an excess of sulfuric acid. This means that, after the expelling of $SO_2$, a predetermined amount of free sulfuric acid will remain in this part flow which may be, for example, in the range of 1 to 10%. The amount of the acid remaining in the part flow can be continuously ascertained after the degassing procedure in a simple manner, for example, by measuring the conductivity of the liquid.

The amount of sulfuric acid to be added can thus be easily regulated in accordance with the measurement obtained. The liquid emanating from the first degassing stage which liquid still contains sulfuric acid, is then admixed with the remainder of the circulating liquid and is conveyed to a second degassing stage. The $SO_2$ obtained in this second degassing stage may be recycled into the crude gas flow fed to the plant, unless a different use can be found for this amount of $SO_2$. The $SO_2$ emanating from the first degassing stage which is 100% pure can be compressed after drying and thereafter be liquified.

The various features of novelty which characterize the invention are pointed out with particularity in the claims annexed to and forming a part of this specification. For a better understanding of the invention, its operating advantages and specific objects attained by its use, reference should be had to the accompanying drawings in which there are illustrated and described preferred embodiments of the invention.

Figure 2:
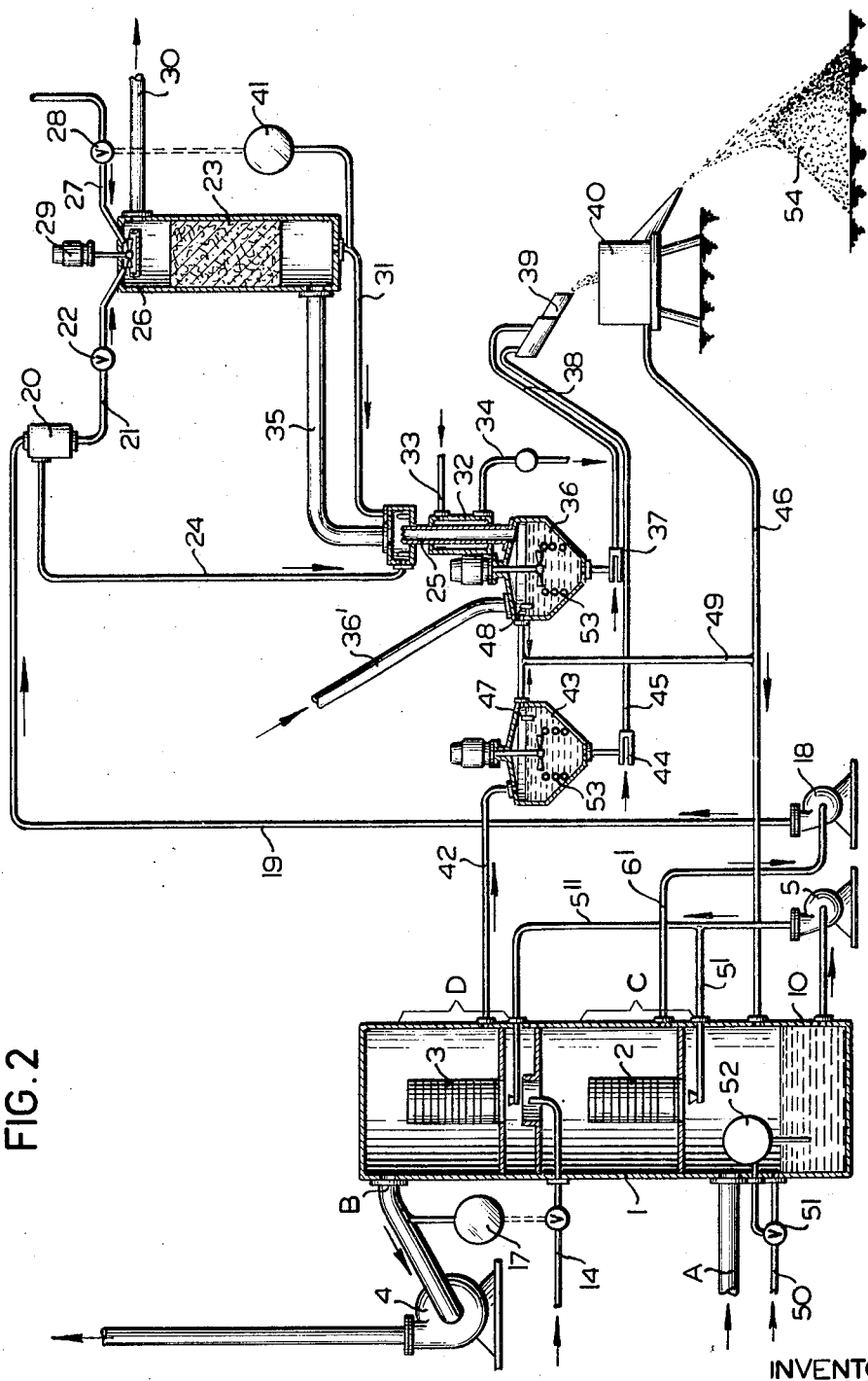

In the drawings:

FIG. 1 is a diagrammatic showing of a first embodiment of a gas purification plant for carrying out the inventive process; and FIG. 2 is a diagrammatic showing of a second embodiment of such a plant.

Referring now to FIG. 1, the gas purification plant there shown is arranged behind a sulfuric acid contact plant. The plant includes the casing 1 of a two-stage separator. The two-stage separator is a so-called Petersen pressure differential or pressure jump separator as it is well known in the art. The principles of pressure differential or pressure jump separators have been disclosed, for example, in U.S. patent application Ser. No. 290,364, as previously set forth. The casing 1 has at its left-hand lower end an inlet pipe A for the supply of a gas flow and at the right-hand upper end an outlet pipe B for the discharge or exit of the purified gas. The gas flow is sucked through the casing by means of the blower 4 and is thus positively forced through the separator. In the embodiment shown in FIG. 1, a crude gas flow of a temperature of about 50 to 60° C. is introduced through the inlet pipe A. The gas flow contains about 5 grams per cubic meter of $SO_2$ and also sulfuric acid mists.

Reference letter C indicates the prestage or pretreatment zone, while reference letter D represents the main stage of the inventive process. Both in the pre-stage and also in the main stage of the process, mechanical separating elements in the form of parcels or units of nozzle rings are used as separating or precipitation means. In the prestage C, these nozzle ring units 2 are used as absorption means. A most intimate contact between the gas flow and injected liquid takes place in the slits or slots between the nozzle rings of the separator. In the main stage D, the nozzle ring units 3 serve primarily the purpose of causing precipitation or separation of the formed ammonium sulfite. Wash liquid or wash liquor is sprayed in atomized form into the gas flow passing through the separator both ahead of the pre-stage C and ahead of the main stage D. This is accomplished by the conduits 5', 5" through which the wash liquid or wash liquor flows from a receptacle to a pump 5 being provided for feeding the liquid material through the conduits. The temperature of the liquid is about 30 to 40° C. The liquid, which is sprayed into the pre-stage C, is largely carried along by the gas flow and is separated in the nozzle ring parcels 2. Due to the atomization of the liquor in the pre-stage and the intimate contact between the gas flow and the liquor in this pretreatment, about 50% of the $SO_2$ originally contained in the gas flow are absorbed by the liquor which, as stated, is separated in the parcels 2. The thus separated liquor flows through line 6' to the heat exchanger 6. The liquor may be heated in the heat exchanger by indirect heat exchange, for example, by providing steam coils 16. The temperature of the liquor may thus be raised by about 3° C. The liquor is subsequently conveyed through conduit 7' to the degassing device 7. Sulfuric acid is also added to the degassing device through line 7". Air is introduced into the degassing device by means of the blower 8 through conduit 8'. This air takes up the expelled $SO_2$ and the $SO_2$-air mixture exits through the outlet 8".

The $SO_2$ laden air is then recycled into the contact plant for the sulfuric acid production and serves in this plant as dilution air for the catalytic oxidation of $SO_2$ to $SO_3$.

The wash liquor from which the $SO_2$ has been removed flows through conduit 9' into a crystallizer 9 which is fitted with a stirrer R. The crystallizer 9 is cooled for about 2 to 3° C. by means of cooling coil 15. Cooling water flows through the coil 15. Solid ammonium sulfate is formed in the crystallizer and continuously withdrawn through the discharge 9" at the bottom of the crystallizer. The remaining mother liquor flows through conduit 10' into the receptacle 10 from where it is recycled into the casing 1. The receptacle 10 is provided with a heating device 16. A portion of the liquor which is fed by the pump 5 through line 5" is sprayed into the gas flow ahead of the main stage D of the gas purification plant. Ammonia is also injected into the gas purification plant ahead of the main stage D. This is effected by the blower 14 which blows air through the line 14'. Line 14' opens up into the separator between the pre-stage C and the main stage D. Ammonia is added to the air through the line 14". The ammonium sulfite thus formed and the sprayed in liquid are separated in the nozzle ring parcel 3 of the main stage.

The liquid which is separated and withdrawn from the main stage flows through line 11' into the crystallizer 11. The crystallizer 11, in the same manner as the crystallizer 9, is fitted with an agitating mechanism R. The crystallizer 11 is cooled for about 2 to 3° C. by the cooling coil 15. Solid ammonium sulfate is continuously withdrawn from the crystallizer through the discharge 11" as indicated at the bottom of the crystallizer. The mother liquor flows back through line 10" into the receptacle 10.

Steam may be supplied to the separator both into the pre-stage C and also into the main stage D. For this purpose, a steam source 12 is provided having conduits 12' and 12" which respectively terminate ahead of the pre-stage and the main stage. The conduits 12' and 12" are controlled by valves 13 to adjust the amount of steam. The addition of the steam causes heating of the inner space of the separator 1. For this reason, it is not necessary to heat the receptacle 10. However, it is, of course, feasible to provide heating in the receptacle 10 as indicated by the heating element 16.

The pure gas flow which exits through outlet pipe B and blower 4 contains less than 0.1 gram of $SO_2$ per cubic meter and is free from sulfuric acid mists. The plant operates continuously, and solid ammonium sulfate is obtained as a final product.

Referring now to FIG. 2, this figure represents a plant for the removal of $SO_2$ from a gas flow which contains about 5 to 10 grams of $SO_2$ per cubic meter. The purified gas flow contains less than 0.2 gram of SO₂ per cubic meter. In the embodiment of FIG. 2, SO₂ of higher concentration may be obtained than if one proceeds according to the embodiment of FIG. 1. If desired, the embodiment of FIG. 2 enables the production of 100% SO₂. As in the embodiment of FIG. 1, a two-stage Petersen pressure differential separator is used, the separator comprising a casing 1 having inlet A and outlet B. As in the first embodiment, the SO₂-containing gas flow is sucked through the separator by means of the blower 4. Again, the separator has a pre-stage C and a main stage D both of which comprise units or parcels of nozzle or jet rings as separating elements. For simplicity's sake, only a single parcel or unit of such nozzle or jet rings has been indicated in the drawings, although it will be appreciated that several such parcels or units can be used. The wash liquid is sprayed by means of the pump 5 into the two stages C and D through the lines 5' and 5''. The receptacle 10 in the present embodiment forms an integral part of the casing 1, to wit, it is built into the bottom of the casing of the separator. The mother liquor obtained after the crystallization is recycled into this container 10.

For the purposes of the main stage D, ammonia is introduced into the separator 1 through the line 14 which terminates below the nozzle parcel 3. The amount of ammonia added is automatically adjusted in response to the SO₂ content of the final purified gas flow exiting through the outlet B. For this purpose, a measuring or analysis instrument is provided which is diagrammatically indicated by reference numeral 17. The conductivity of a small stream of water is used as the measuring quantity for the SO₂ content. This stream of water is intimately washed in a gas washing flask with a small part flow of the purified gas tapped from the exit conduit B. This partial gas flow used for analytical purposes amounts only to about 50 liters per hour. In response to the conductivity ascertained, the amount of ammonia added through line 14 is automatically adjusted.

The liquid which is separated in the pretreatment zone constituted by the separating device 2 consisting of the nozzle rings, is laden with SO₂ and flows through line 6', through a dosage pump 18 and thereafter through line 19 to an intermediate container 20 situated above the remainder of the plant. This intermediate container 20 distributes the SO₂ laden liquor through line 21 to the degassing device 23 and through line 24 to the degassing device 25. The flow through line 21 is controlled by valve 22.

A mixing vessel 26 is situated in the degassing device 23. This mixing device 26 is supplied on the one hand with liquor through line 21 and on the other hand with sulfuric acid flowing through line 27, the latter being controlled by valve 28. The mixing device has a mixer 29 to mix the liquid with the sulfuric acid and the mixture thus obtained flows over the top rim or edge of the mixing vessel 26 to fall onto the packing or filling of the degasser 23. The liberated SO₂ gas exits through line 30 to the sulfuric acid contact plant (not shown). The degasser 23 thus operates, from a practical point of view, as an SO₂ developer. A gas can be produced which consists of pure SO₂.

The liquor portion which is freed from SO₂ in the degasser 23 and which contains ammonium sulfate, flows then through line 31 toward and into the head portion of the degassing device 25 which is provided with a steam jacket 32. That portion of the liquor which is conveyed through line 24 and which has not yet been degassed is thus combined with the degassed liquor portion in the degasser 25. As will be seen, the two flows meet at the head of the degasser 25. Steam flows through line 33 into the steam jacket 32 and the condensate is discharged through line 34. Due to the heating, additional SO₂ is expelled from the mixture which is formed at the head of the degasser 25. This SO₂ escapes through line 35 and enters the bottom portion of the degasser 23. The SO₂ which has previously been formed in the degasser 23 thus, in conjunction with the SO₂ entering the degasser through line 35, is discharged through line 30. If SO₂ of 100% concentration is to be produced in the degasser 23, then the gases exiting from the degasser 25 are not conveyed to the degasser 23, but are separately further processed or are recycled into the crude gas flow which enters the Petersen pressure differential separator through inlet A.

The degassed liquor then flows into the crystallizing vessel 36, below the degasser 25. Air may be blown into vessel 36 through line 36'. This air will thus mix with the SO₂ gases in the degasser 25. Classifying or selective crystallization takes place in the vessel 36. A crystal slurry is discharged at the bottom of the crystallizer through the injector 37 and through line 38 is conveyed to a chute 39 from where the slurry falls into the centrifuge 40.

The amount of free sulfuric acid in the liquor which flows through conduits 31 after having been degassed in the degasser 23, is determined by means of analytical methods. For this purpose, an instrument, schematically indicated by reference numeral 41, in provided which serves the purpose of giving an indication of the free acid concentration in the liquor or a measurement from which the free acid concentration can be deduced or calculated, as, for example, the conductivity. The amount of sulfuric acid to be added is then controlled in response to the result by means of the valve 28.

The liquor which is discharged from the separator elements 3 in the main stage D of the process flows through line 42 into the crystallizer 43 where also a direct crystallization of ammonium sulfate takes place. The descending crystal slurry is conveyed by means of the compressed air injector 44 through line 45 to the chute 39, previously referred to, and falls from there into the centrifuge 40. The mother liquor which is obtained as a result of the centrifuging flows through lines 46 into the receptacle 10. The same applies to the mother liquors obtained in the crystallizers 36 and 43 which liquors are discharged through weirs 47 and 48 and flow through conduit 49 into conduit 46 which leads to the receptacle 10.

The water loss which occurs during the circulation of the liquor is made up for. This is accomplished by adding water through line 50 as seen at the left-hand bottom of the drawing. The water carrying line 50 is fitted with a valve 51 which is actuated by the float 52 provided in the receptacle 10.

Due to the precipitation or separation of the SO₃, the sulfuric acid mists and the SO₂ in concentrated ammonium sulfate liquor and due to the subsequent decomposition of the sulfite with sulfuric acid, an over-saturation of the liqor takes place in the circulating liquor at monium sulfate. These two areas are the crystallizers 36 and 43 which are maintained at a cooler temperature than the inner space of the Petersen separator. For this purpose, cooling pipes 43 are provided which cause the crystallizers to be maintained at a temperature which is about 2 to 5° C. cooler than the temperature within the separator. By means of the inventive process, and without any concentration being necessary, solid ammonium sulfate 54 is directly recovered. If desired, the plant may be operated in such a manner that ammonium sulfate solution is instead obtained as a final product.

While specific embodiments of the invention have been shown and described in detail to illustrate the application of the inventive principles, it will be understood that the invention may be embodied otherwise without departing from such principles.

What is claimed is:
1. A process of removing SO₂ from an SO₂-containing gas flow, which comprises adding gaseous ammonia to the gas flow, injecting into the gas flow a liquid con- taining at least one of ammonium sulfite, ammonium bisulfite and/or ammonium sulfate, whereby $(NH_4)_2SO_3$ mist is formed, and conveying the gas flow to a mechanical separating zone in which the gas flow and the injected liquid are brought into intimate contact with each other and said gas flow is divided into a plurality of part flows of less than 5 millimeters thickness, said mechanical separating zone having a gas resistance of more than 40 millimeters water column, whereby said mist and said injected liquid are separated from said gas flow.

2. A process as claimed in claim 1, wherein the amount of ammonia added to said gas flow is adjusted in dependence on the $SO_2$ content of said gas flow which remains after separation of said mist and said injected liquid.

3. A process as claimed in claim 1, wherein said part flows have a thickness of between about 0.2 to 2 millimeters, said mechanical separating zone having a gas resistance of about between 80 to 350 millimeters water column.

4. A process as claimed in claim 1, wherein at least a portion of the separated liquid is conveyed to a crystallizing zone to separate ammonium sulfate from the liquid by selective crystallization, whereafter the remaining mother liquor is recycled for injection into said gas flow.

5. A process as claimed in claim 1, wherein, prior to the addition of said ammonia, said gas flow is passed through an absorption zone in the presence of a wash liquor containing ammonium sulfite and ammonium sulfate to remove a portion of the $SO_2$ from the gas flow by absorption.

6. A process as claimed in claim 5, wherein said absorption zone is in the form of a mechanical separator in which the gas flow is subjected to pressure differentials.

7. A process as claimed in claim 5, wherein at least a portion of the wash liquor after having absorbed said portion of the $SO_2$ is admixed with $H_2SO_4$ to liberate $SO_2$, whereafter the remaining wash liquor is recycled for injection into said gas flow.

8. A process as claimed in claim 7, wherein at least a portion of the wash liquor, after the liberation of the $SO_2$ and prior to said recycling, is passed through a crystallizing zone to crystallize ammonium sulfate.

9. A process as claimed in claim 8, wherein said crystallization is facilitated by contacting the wash liquor in said crystallizing zone with solid ammonium sulfate.

10. A process as claimed in claim 1, wherein said liquid is heated prior to being injected into said gas flow to prevent crystallization in said separating zone.

11. A process as claimed in claim 8, wherein the wash liquor is heated prior to the addition of the sulfuric acid and is cooled prior to said crystallization.

12. A process as claimed in claim 1, wherein steam is added to said gas flow prior to the addition of said ammonia.

13. A process as claimed in claim 1 wherein steam is added to said gas flow prior to the injection of said liquid.

14. A process as claimed in claim 12, wherein 0.5 to 10 grams of steam are added per N cubic meter of gas flow.

15. A process as claimed in claim 12, wherein 1 to 4 grams of steam are added per N cubic meter of gas flow.

16. A process as claimed in claim 4, wherein a temperature differential of between about 2 to 10° C. is maintained in the liquid while it circulates between the separating zone and the crystallizing zone.

17. A process as claimed in claim 4, wherein the crystallization is effected at a temperature which is about 2 to 5° C. cooler than the temperature in the separating zone.

18. A process as claimed in claim 5, wherein said liquid and said wash liquor have the same composition.

19. A process as claimed in claim 7, wherein the liberation of the $SO_2$ is effected in two stages, to wit, a first stage in which a portion of the wash liquor is admixed with an excess of sulfuric acid to expel $SO_2$ and a second stage wherein the remaining liquid and the liquid from which $SO_2$ has been expelled are combined and conveyed to a degassing zone.

20. A cyclic process of removing $SO_2$ from an $SO_2$-containing gas flow which comprises:
  (a) adding gaseous ammonia to the gas flow, spraying into the gas flow a liquid containing at least one of ammonium sulfite, ammonium bisulfite and/or ammonium sulfate, adding 0.5 to 10 grams of steam per N cubic meter of gas flow, whereby a mist is formed;
  (b) introducing the thus enriched gas flow into a separating zone in a mechanical separator which divides the gas flow into a plurality of part flows of less than 5 mm. diameter, said mechanical separator having a gas resistance of more than 40 millimeters water column, whereby intimate contact between the gaseous and liquid phases of the gas flow takes place and the mist and the liquid are separated from the gas flow;
  (c) conveying the separated mist and liquid to a crystallizing zone maintained at a temperature which is between about 2 to 10° C. cooler than the temperature in the separating zone, whereby ammonium sulfate crystallizes and a mother liquor remains; and
  (d) recycling the mother liquor as said liquid for spraying into said gas flow.

21. A process as claimed in claim 20, wherein said gas flow, prior to the addition of said ammonia and said liquid and prior to being conveyed to said separating zone, passes through an absorption zone into which a quantity of said liquid is introduced to absorb a portion of the $SO_2$, whereafter the thus enriched liquid is conveyed to a degassing zone in which $SO_2$ is expelled by the addition of sulfuric acid, the thus treated liquid thereafter being conveyed to a crystallizing zone maintained at a temperature which is about 2 to 10° C. cooler than the temperature in said separating zone, whereby ammonium sulfate crystallizes and a mother liquor remains, said mother liquor thereafter being recycled for being introduced into one of said absorption and separating zones as said liquid.

References Cited

UNITED STATES PATENTS

| 2,902,342 | 9/1959 | Kerley | 23—119 X |
| 3,375,058 | 3/1968 | Petersen et al. | 23—2 X |

FOREIGN PATENTS 363,215  12/1931  Great Britain.

OSCAR R. VERTZ, Primary Examiner

E. C. THOMAS, Assistant Examiner

U.S. Cl. X.R.

23—119, 178